United States Patent [19]

Kearsley

[11] Patent Number: 4,792,961
[45] Date of Patent: Dec. 20, 1988

[54] LASER DEVICES

[75] Inventor: Andrew J. Kearsley, Oxford, England

[73] Assignee: Oxford Lasers Limited, Oxford, England

[21] Appl. No.: 755,421

[22] Filed: Jul. 16, 1985

[30] Foreign Application Priority Data

Jul. 17, 1985 [GB] United Kingdom ............... 8418169

[51] Int. Cl.⁴ .............................................. H01S 3/14
[52] U.S. Cl. ......................................... 372/68; 372/56; 372/58; 372/61; 372/34
[58] Field of Search ............... 372/68, 55, 56, 58, 372/61, 62, 23, 64, 33, 34, 66, 65

[56] References Cited

U.S. PATENT DOCUMENTS 4,065,731 12/1977 Wang .................................. 372/61

OTHER PUBLICATIONS

Kalugin et al., "Multicolor Laser Using Transitions of Copper and Gold Atom With Emission in UV, Green, Yellow, and Red Regions", Sov. Tech. Phys. Lett., 6(3), Mar. 1980, pp. 121-123.

Primary Examiner—William L. Sikes
Assistant Examiner—Georgia Y. Epps
Attorney, Agent, or Firm—Spencer & Frank

[57] ABSTRACT

A metal vapor laser which can produce two or more discrete outputs from a single vacuum chamber. This is achieved by using two or more different materials and by confining each material to its own area so that the materials do not mix one with the other and optimum lasing performance can be obtained from each material. All the lasing areas have a common optical axis. The lasing outputs can be produced separately or mixed together as required.

10 Claims, 2 Drawing Sheets

LASER DEVICES

BACKGROUND OF THE INVENTION

This invention relates to laser devices and particularly, although not exclusively, to those which use as lasing media materials which are normally either solid or liquid at room temperature and which lase in the gas or vapor phase.

For any one material used as a looing medium, there is usually one frequency output which is the easiest to obtain and which in operation usually predominates. However, it is often required that a laser should be able to produce two or more outputs of different wavelengths.

Combining two materials in an admixture and using them together so that both materials receive the same excitation, does not work satisfactorily because each material requires different optimum conditions. Often operating in this manner causes one material adversely to affect the excitation of emission of the other.

SUMMARY OF THE INVENTION

According to the invention there is provided a laser device capable of producing lasing output from at least two materials, each of which requires different conditions to produce optimum stimulated emission or which is a material whose lasing performance is less than the optimum in the presence of another material, the laser device comprising a vacuum chamber, a separate region within said chamber for each material, all said regions having a common optical axis, means for confining each material to its own region and means for producing in each region the appropriate conditions for stimulated emission.

BRIEF DESCRIPTION OF THE DRAWINGS

Embodiments of the invention will now be described, by way of example only, with reference to the accompanying drawings, in which.

DESCRIPTION OF THE PREFERRED EMBODIMENTS

Figure 1:
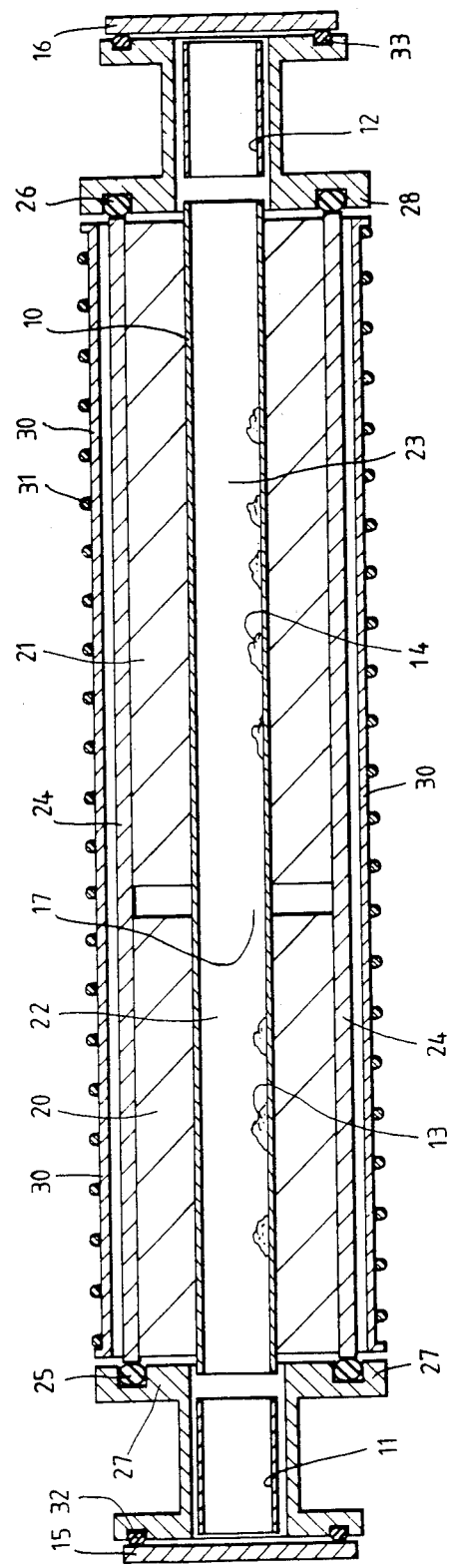
FIG. 1 is a longitudinal section through a laser device constructed in accordance with the invention, and, FIG. 2 is a longitudinal section through a laser device similar to FIG. 1 but showing only part of the construction.

Referring now to FIG. 1, the laser device has a discharge chamber formed by a ceramic tube 10. Discharge is generated in the tube 10 between an electrode 11 at one end of the tube and a second electrode 12 at the other end. The electrodes 11, 12 are connected to a power supply system which is not illustrated. The power system generates a pulsed discharge in the tube at a repetition rate of 5 kHz. Upon start up the discharge gradually heats up the tube 10 until globules, or granules, 13, 14 of pure metal are vaporized and the metal can then be made to lase.

The lasing output travels longitudinally along the tube and is reflected between a mirror 15, which is a high reflectivity mirror and which reflects the majority of the emission, and a window 16, which is a low reflectivity mirror and which only reflects part of the emission, the remainder passing through this window to form the output of the laser.

The discharge tube 10 emits heat from the discharge along all its length. At a position along its length there is a cool zone 17. This zone is formed between two pieces of cylindrical thermal insulation 20, 21 which surround the tube 10 but which are spaced apart axially to form an annular gap at zone 17.

Heat can thus escape through the annular gap causing zone 17 to be cooled to a lower temperature than the remainder of the tube thus forming the cool zone.

The cool zone effectively divides the discharge tube into two sections so that the material in the first section 22, which is copper, will lase satisfactorily but will not migrate beyond the section 22. Also it will not mix with the material in the second section 23, which is gold, and this material too will lase satisfactorily without migrating into the first section. The sections 22, 20 are of a length chosen to give the desired output power ratio from the two materials.

Thus, two sections 22, 23 of the single discharge tube 10 are used to generate a lasing output from two different materials, in this case copper and gold, which require different conditions to produce optimum stimulated emission but where the outputs emerge together from a single output window 16. It has been found in practice that mixing copper and gold together in a single discharge section produces an output in which the copper predominates and optimum performance is not obtained from either material.

The function of the cool zone is to prevent inter diffusion between the metals in the two sections by causing the metal vapors to condense if they reach the cool zone. A wick arrangement may be provided to encourage condensed liquid metal to migrate towards the center of the respective section so as to revaporize, but such an arrangement has not been illustrated.

Turning now to consider the detailed construction of the laser device, the discharge tube 10 and thermal insulation 20, 21 are supported within a cylindrical vacuum jacket 24 which seats against 'O' rings 25 and 26 located in annular recesses in the end plate members 27, 28. These end plate members are secured as by screws (not shown) so as to compress 'O' rings 25, 26 against the vacuum jacket 24. A cooling jacket 30 is mounted around the vacuum jacket 24, the cooling Jacket consisting of a flanged cylinder having tubular coils 31 wound helically around the outside. The coils are brazed to the jacket 31, so as to make good thermal contact therewith and the coils carry a cooling medium such as water.

The mirror 15 and window 16 are sealed to end plate members 27, 28 respectively by 'O' rings 32, 33 so as to complete the vacuum chamber.

In an alternative arrangement (not shown) the mirror 15 can be made to reflect all the lasing output from the gold but only partially to reflect the output from the copper. Similarly, the mirror 16 can be made to reflect all the lasing output from the copper but only partially to reflect the output from the gold. In this way the output from the copper will emerge along from one end while that from the gold will emerge alone from the other.

The insulation 20 has different thermal properties from insulation 21 to achieve the required temperatures in the respective sections. These temperatures are respectively about 1450° C. for copper and about 1550° C. for gold. The difference in insulating properties between the two pieces of insulation 20, 21, may be achieved either by making the pieces from different materials or by using the same material and either making one piece in a different thickness or by machining grooves in one of the pieces.

Figure 2:
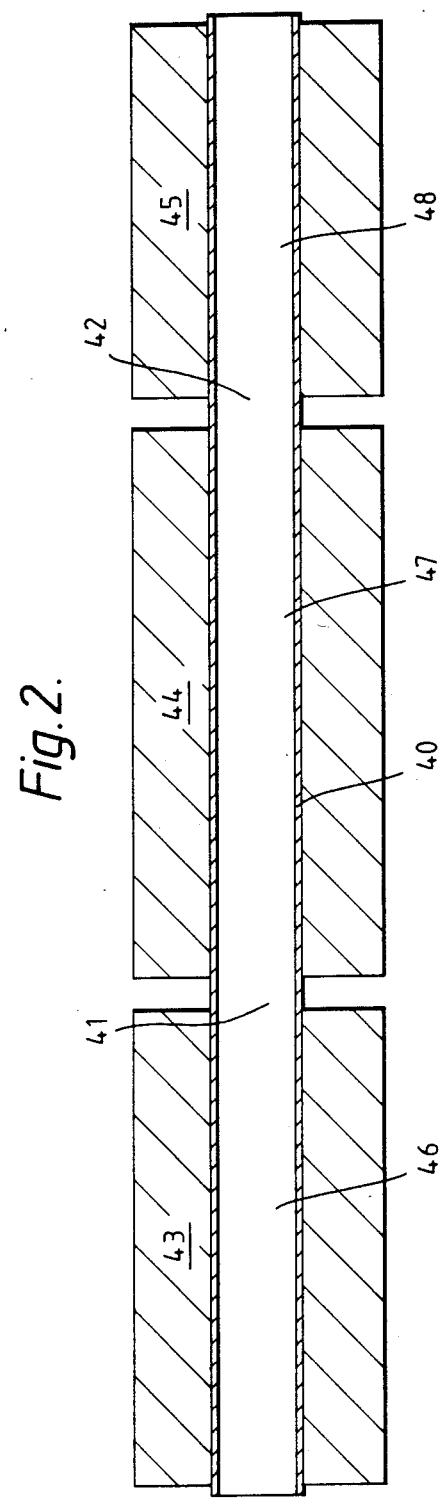

Referring now to FIG. 2, there is shown a discharge tube 40 having two cold zones 41, 42 defined between three lengths of insulation 43, 44, 45, thus giving three discharge sections 46, 47, 48 for three different materials, e.g. copper, gold and manganese. From such an arrangement, the three primary colors red, green and blue needed for full color displays, can be produced.

I claim:

1. In a laser device for producing a lasing output from at least first and second materials each capable of lasing under different thermal conditions, said laser device having a resonant cavity and a pair of electrodes, the combination comprising an evacuated discharge chamber interposed between said pair of electrodes, said chamber being divided into at least first and second regions having a common optical axis, said first material being located within said first region, said second material being located within said second region, and said first and second regions being separated by a cool zone comprising means for confining each of said materials within its respective region; and means for producing thermal conditions in said first and second regions which permit lasing of each of the materials located therein, the laser output of each of said first and second materials combining to form the laser output of said laser device.

2. A laser device as claimed in claim 1 wherein said cool zone is formed by an area of increased heat loss.

3. A laser device as claimed in claim 2 wherein said discharge chamber is surrounded by insulation and wherein said area of increased heat loss is formed by reduced insulation.

4. A laser device as claimed in claim 1 wherein each of said first and second regions has different thermal loss properties.

5. A laser device as claimed in claim 2 wherein each of said first and second regions has different thermal loss properties.

6. A laser device as claimed in claim 3 wherein each of said first and second regions has different thermal loss properties.

7. A laser device for producing a laser output from a plurality of materials each capable of lasing under different thermal conditions, said laser device having a resonant cavity and a pair of electrodes, comprising an evacuated discharge chamber interposed between said pair of electrodes, said chamber having a longitudinal axis and a plurality of regions spaced along said axis, one of said plurality of lasing materials being located in each of said plurality of regions; and a plurality of insulation members surrounding said discharge chamber and being spaced along the axis thereof, one of said insulation members surrounding each of said regions of said discharge chamber, the thermal properties of the insulation member surrounding each of said regions determining the temperature therein and the spaces between said insulation members preventing migration of said lasing materials from one region to another, the lasing outputs of each of said first and second materials combining to form the laser output of said laser device.

8. A laser device as clamed in claim 7 wherein the relative lengths of said regions determine the proportion of the output power due to each of said materials.

9. A laser device as claimed in claim 7 wherein said insulating members are made of different materials.

10. A laser device as claimed in claim 7 wherein one of said lasing material is copper and the other gold, and wherein the temperatures in the regions in which they are located are about 1450° C. and 1550° C. respectively.

* * * * *